INVENTORS
RENVILLE H. McMANN, JR.
KENNETH D. ERHARDT
BY
ATTORNEY

INVENTORS
RENVILLE H. McMANN, JR.
KENNETH D. ERHARDT
BY
ATTORNEY

United States Patent Office 2,835,730
Patented May 20, 1958

2,835,730

AUTOMATIC BALANCING OF COLOR SUB-
CARRIER BALANCED MODULATOR

Renville H. McMann, Jr., New York, N. Y., and Kenneth
D. Erhardt, North Hollywood, Calif., assignors to
Radio Corporation of America, a corporation of Delaware Application January 28, 1955, Serial No. 484,674

2 Claims. (Cl. 178—5.4)

The present invention relates to improvements in electrical signal processing circuits and more particularly to improvements in signal processing circuits of the balanced type.

More directly, the present invention relates to automatic control means for maintaining a predetermined balance in electrical circuits of the type having one or more cooperating branches which must be maintained in a predetermined balanced relation to one another. More specifically, the present invention provides novel means for maintaining a predetermined balanced condition in signal combining circuits designated to provide vectorial multiplication of two or more electrical signals with balanced type cancelling means for suppressing, reducing or otherwise minimizing one or more of the signals being multiplied in their representation among the products of multiplication, as for example in balanced modulator circuits.

In the engineering of electrical systems there frequently arises the need for providing means for non-linearly combining two or more alternating current signals with one another whereby the signals are effectively multiplied to produce a resulting product signal representing a vectorial multiplication of the electrical signals. It is further often desirable to eliminate from the resulting product signal any representation of the original signals involved in the vectorial multiplication. This elimination is commonly accomplished by signal cancelling techniques where one or both of the signals being multiplied are cancelled by the multiplying circuit itself or are later cancelled from the product by linearly subtracting from the product signal the unwanted signals. It is well known that in all such circuit arrangements for producing cancellation it is necessary to maintain a rather precise state of balance between two or more circuit parameters so that the signal or signals to be cancelled are reduced in amplitude by the desired amount.

A well known form of signal multiplying circuit illustrative of the problem with which the present invention is concerned is that of the balanced modulator circuit. In one form of the balanced modulator circuit two amplifier devices are connected in shunt with a common load means and the signals to be multiplied or modulated by one another are applied simultaneously to the input circuits of both amplifier devices. The electrical senses of the signals thus applied are established so that the signals themselves will tend to cancel one another in the common load circuit while the products of multiplication will be developed and made readily available across the load circuit. In such an arrangement an unbalance in the characteristics of one or both of the amplifier devices or in the amplitude of the signals applied to the amplifier devices may prevent full cancellation of the signals being multiplied due to unequal contributions of each amplifier device to the load circuit. Where balance in such a circuit has once been achieved it may be subject to shifting as various parameters of the circuit age or otherwise change in value.

In many circuit applications this tendency of a balanced modulator circuit to change its degree of balance may produce intolerable deleterious results in the over-all system operation. An example of the foregoing is found in color television signal synthesis and processing. According to present-day standards it is required that a color subcarrier be modulated by color difference signals to produce upper and lower sideband products which are transmitted on a suppressed subcarrier basis such that the color subcarrier is virtually absent from the color television signal when no color difference information signal is being transmitted. The resulting modulation in effect corresponds to amplitude modulation of the color subcarrier in accordance with color saturation and phase modulation of the subcarrier in accordance with hue information. Should unbalance of the balanced modulator circuit occur, the residual color subcarrier will produce a contaminating influence on the color signal and result in inability to reproduce the color television signal with proper color fidelity since the receiving apparatus cannot discriminate between the color subcarrier per se and its products of modulation by the color difference signals.

It is therefore an object of the present invention to provide improved automatic balancing means for maintaining a predetermined degree of electrical signal balance in electrical signal transducing systems.

It is another object of the present invention to provide an improved circuit for vectorially multiplying two or more electrical signals to produce product signals representing only the mathematical products of the electrical signals to the exclusion of one or more of the signals being multiplied.

It is another object of the present invention to provide improved modulator circuit having means for automatically maintaining a predetermined magnitude of balanced cancellation in its modulation products of one or more of the signals applied to the modulation circuit.

It is another object of the present invention to provide automatic means for maintaining a predetermined degree of balance in a balanced modulator circuit whereby to overcome the tendency for a change in said predetermined degree of balance as a result of fortuitous variations in the values of the circuit parameters comprising the balanced modulator circuit.

It is further an object of the present invention to provide an improved balanced modulator system for use in standard color television signal synthesis by which the color television subcarrier may be reliably modulated with color difference information on a suppressed carrier basis in such a way that fortuitous variations in the values of the circuit parameters comprising the balanced modulator system do not degrade the fidelity with which color information may be ultimately reproduced from the color signal.

In the realization of the above objects and features of advantage it is contemplated in practicing one form of the present invention to provide electrically responsive means for adjusting the balance in the signal multiplying circuit. The product signal produced by the multiplying circuit is then employed to develop a balanced circuit signal which is representative of the amplitude of the signal or signals it is desired to cancel as they appear in the product signal. This balance control signal is then applied to the electrically responsive balance control means to maintain that degree of balance or cancellation in the multiplication circuit which will result in the maintenance of one or both of the signals being multiplied at the desired level. In practice, the balancing or cancellation action may be automatically regulated to maximize and maintain the balance and signal cancellation effects so as to reduce in the product signal the amplitude of the signals being multiplied to virtually zero.

In the application of the present invention to color television signal processing and synthesis, the color carrier to be modulated is applied to one input terminal of a balanced modulator circuit while the color difference information is applied to another input terminal of the balanced modulator circuit. Means are then provided for controlling the balance in the balanced modulator circuit in accordance with a balance control signal. To control the balance, the modulated signal delivered by the balanced modulator circuit is sampled by a circuit responsive only during the video blanking interval to the color subcarrier frequency. Any color subcarrier signal detected during the video blanking interval is caused to produce the balance control signal which is in turn applied to the signal responsive balanced control means with an electrical sense tending to balance and therefore minimize the amount of color carrier frequency signal delivered by the demodulator circuit.

A better understanding of the present invention will be obtained through a reading of the following specification taken in connection with the drawings, in which.

Figure 1:
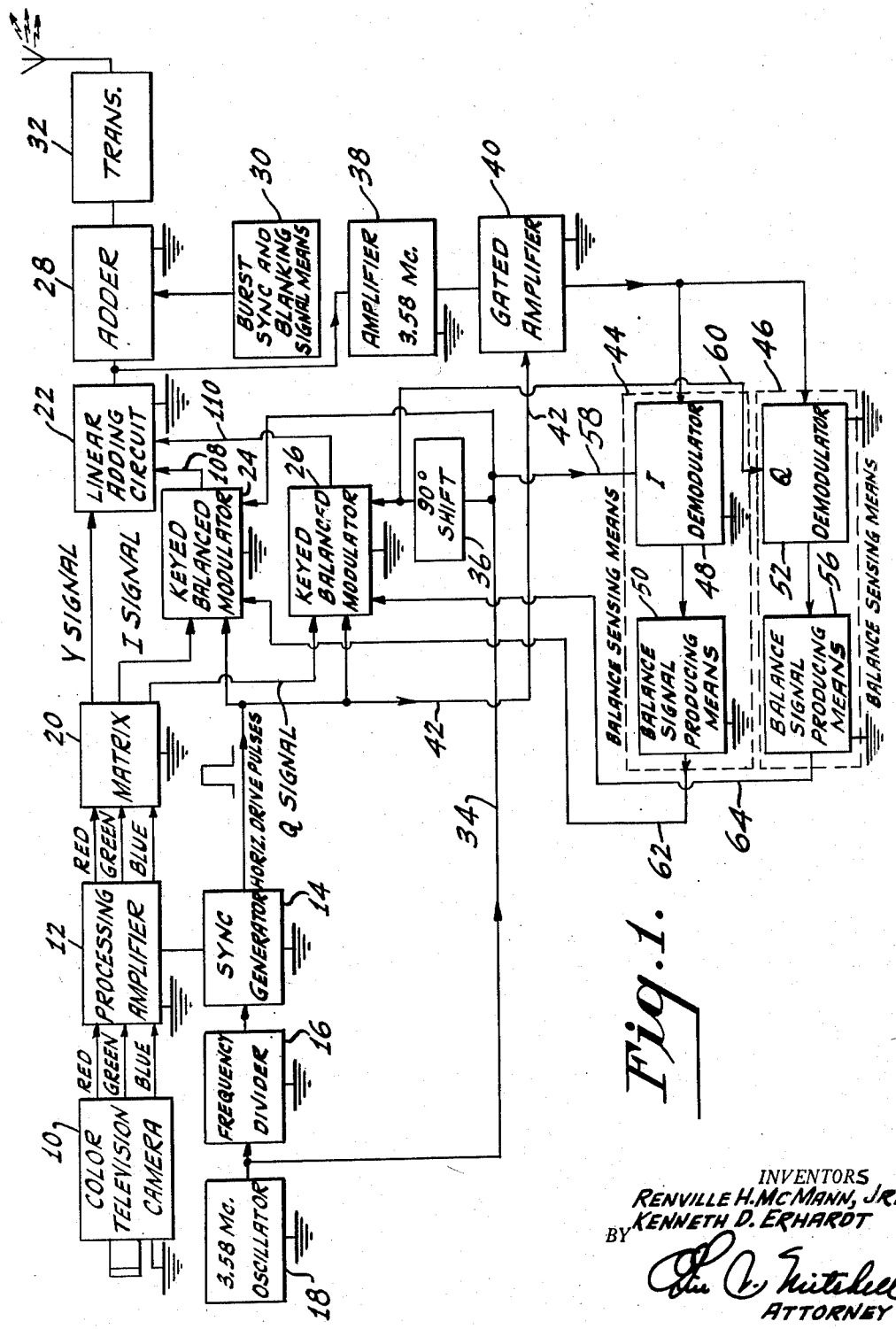
Fig. 1 is a block diagram representation of a color television system in which the present invention is embodied.

Turning now to Fig. 1, there is shown at 10 a color television camera of any conventional type capable of producing color television signals suitable for application to a standard television processing amplifier 12. By way of example, the camera 10 has been shown as producing red, green and blue direct color signals. In accordance with standard practice, blanking signals from a local synchronizing signal (sync) generator 14 are applied to the processing amplifier 12 for use in establishing direct current datum information as well as removing any residual noise signals developed by the color camera 10 during the blanking interval. The sync generator 14 is controlled by signals from a frequency divider 16 which in turn receives signal from the master control oscillator 18. In accordance with established practice, the oscillator 18 is established at the desired color subcarrier frequency which may be for example approximately 3.58 mc. For simplicity of illustration other well known connections between the color camera 10 and the sync generator 14 have been omitted.

After the signals from the color camera 10 have been processed by the color amplifier 12, the red, green and blue direct color signals are applied to a color matrix circuit 20 of any suitable design in which the direct color signals are combined to produce the standard Y luminance signal and I and Q color signals. The Y signal is conventionally applied to a linear adding circuit 22 while the I and Q signals are applied to respective keyed balanced modulators 24 and 26. The output signals from the balanced modulator circuits 24 and 26 are in turn combined with the Y signal in the linear adding circuit 22 and the resulting signal applied to the adder circuit 28. It is here that the standard color burst synchronizing signal and blanking signal from the source 30 which signals are locked to the sync generator 14 and oscillator 18, are added to the otherwise complete color signal for modulation of the broadcast transmitter 32. The conventional circuit ties between the sync, burst and blanking signal means 30 with the oscillator 18 and sync generator 14 have not been indicated in order to maintain simplicity in the drawing.

According to the general practice the balanced modulators 24 and 26 are termed "keyed" by virtue of their including keyed clamping circuits which must be actuated during the video blanking interval to establish a zero carrier reference for the modulator circuits. The clamping circuits are keyed by some form of control pulses which by way of example in Fig. 1 have been indicated as standard horizontal drive pulses derived from the sync generator 14. The color subcarrier signal for the keyed balanced modulators 24 and 26 is obtained from the oscillator 18 via circuit path 34. The color subcarrier signal is applied directly to the balanced modulator 24 in the I color channel while a 90° phase shift circuit 36 is interposed in the application of the color subcarrier to the Q channel balanced modulator 26. It is required in color television transmission systems that the signals delivered by the balanced modulators 24 and 26 are representative only of the vectorial product resulting from the vectorial multiplications of the I and Q signals with the phase displaced versions of the color subcarrier. As brought out hereinabove, the fortuitous presence of color subcarrier in the output of the balanced modulators 24 and 26 will only tend to contaminate the resulting color television signal with fixed phase and fixed frequency components corresponding to certain colors not necessarily present in the color scene being transmitted. It is therefore important in color television systems that the balanced modulators 24 and 26 be maintained as perfectly in balance as is practicable. Certain circuit parameters comprising the balanced modulators 24 and 26 and their included keying clamping circuit may tend to change their value with time and temperature conditions whereby the balance of the modulator circuits change during signal broadcast.

Those elements of the embodiment of the present invention thus far described in connection with Fig. 1 are conventional in nature. However, the present invention overcoming the noted balance problem employs gated response means for sampling the signal delivered by the linear adding circuit 22 to detect the presence, if any, of color subcarrier signals which would be indicative of an unbalanced condition in the balanced modulators 24 and 26. This is accomplished by coupling the output of the linear adding circuit 22 through a 3.58 mc. amplifier 38 and a gated amplifier 40 which is cyclically keyed into an active condition by the horizontal drive pulses, applied to the gated amplifier 40 by a circuit path 42, to balance sensing means 44 and 46. Each balance sensing means 44 and 46 in the particular arrangement of Fig. 1, comprises a demodulator and a balance signal producing means. More specifically, the balance sensing means 44 comprises an I demodulator 48 and balance signal producing or signal forming means 50 while the balance sensing means 46 comprises a Q demodulator 52 and a balance signal producing means 56. Both the I and the Q demodulators are provided with reference signals respectively corresponding in phase and frequency to the subcarrier signals applied to the keyed modulators 24 and 26 via the circuit paths 58 and 60. The balance signals produced by the balance sensing means 44 and 46 are respectively applied to the Q and I balanced modulators 24 and 26 via circuit paths 62 and 64 for control of the balance conditions of the modulators as a function of the balance signal applied to them. Each balanced modulator includes signal responsive means for controlling the balance in the modulator. Such means will be shown in detail hereinafter.

In the operation of the embodiment of the present invention shown in Fig. 1 the gated amplifier 40 is keyed on during the horizontal drive pulse intervals which according to present color signal standards occur during the blanking interval of the composite color television signal. The gated amplifier 40 thereby constitutes means for sampling the output of the linear mixing circuit 32 during the blanking interval of the composite color television signal. If either of the balanced modulators 24 and 26 becomes unbalanced in operation one or both of the Q and I subcarrier signals applied to the balanced modulator circuits 26 and 24 will appear during the video blanking time as a residual subcarrier signal and be sampled by the gated amplifier 40 to be applied to the I and Q demodulators 48 and 52. Since the I and Q demodulators 48 and 52 are synchronous in operation they will produce output signals only in response to respective residual I and Q subcarrier signals applied to them. The polarity or electrical sense of the demodulator output signal will depend upon the mode of unbalance in the modulator as will later become apparent. Thus if during the video blanking time an I signal is detected by the demodulator 48 the demodulator 48 will develop an output signal which if not directly useable may be suitably modified by the balance signal producing means 50 for application to the I balance demodulator 24 with such electrical sense as to correct for the unbalanced condition in the modulator. In a similar way the presence of Q signal during the video blanking time will cause a balance signal to be delivered by the balance signal producing means 56 for application to the Q balanced modulator 26 with such electrical sense as to correct for the unbalanced condition. In this way both the I and Q balanced demodulators 24 and 26 may be maintained in a very precise condition of balance even though the parameters comprising the balanced modulator circuits are subject to fortuitous changes in value which otherwise would result in unbalancing the modulator circuit action.

Figure 2:
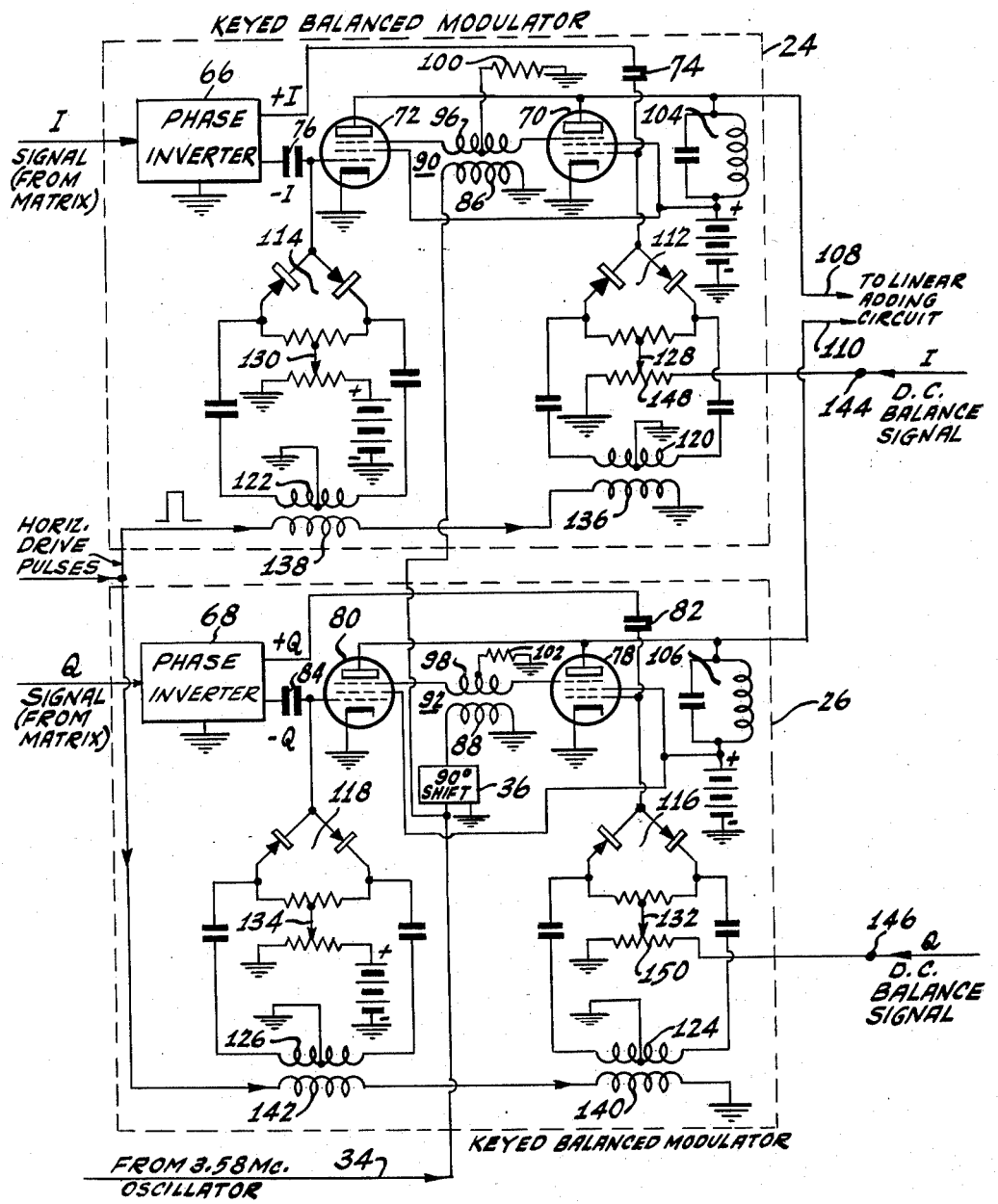
Fig. 2 is a combination block and schematic diagram representation of one form of modulator circuit suitable for use in the arrangement of Fig. 1 and which embodies certain features of the present invention.

Balanced modulator circuits of the keyed clamped type suitable for use as elements 24 and 26 in Fig. 1 may take a variety of forms and are well known in the art. For example, one form of balanced modulator and keyed clamping circuit suitable for use as elements 24 and 26 in Fig. 1 is shown in the dotted line areas 24 and 26 of Fig. 2. The I and Q color difference signals from the matrix 20 in Fig. 1 are applied to conventional phase inverter circuits 66 and 68 (in Fig. 2) to develop positive and negative I and Q signals at the output terminals of the phase inverters. The positive and negative I signals are respectively applied to the control electrodes of the balanced modulator tubes 70 and 72 through coupling capacitors 74 and 76 respectively. Positive and negative Q signals are correspondingly applied to the control electrodes of the balanced modulator tubes 78 and 80 via capacitors 82 and 84, respectively. Signal from the oscillator 18 in Fig. 1 is applied via circuit path 34 to the primary windings 86 and 88 of the injection transformers 90 and 92 respectively. The 90° phase shift network 36 of Fig. 1 is also shown in Fig. 2 placed between the oscillator signal and the winding 88 of the Q signal injection transformer 92. Balanced carrier signals will therefore appear across the secondary windings 96 and 98 of the injection transformers. Secondary windings 96 and 98 are balanced with respect to ground through the connection of their center taps to ground via the resistors 100 and 102. The anodes of the balanced modulator tubes 70 and 72 are connected in shunt with a common load means 104 while the anodes of the tubes 78 and 80 are connected in shunt across a common load means 106. Thus the modulator tubes in each of the modulator circuits have applied to them push-pull color signal and push-pull color subcarrier reference signal. Therefore, if the contributions of each of the tubes to their associated common load circuit are the same, both the color signals and the carrier reference signals will cancel in the load circuit. This will in accordance with conventional ideally balanced demodulator action cause the respective output signals appearing across the respective load means 104 and 106 to correspond only to the products or sidebands of the vectorial multiplication of the I and Q color difference signals with their respective versions of the subcarrier provided by the oscillator 18. The signals developed in the load means 104 and 106 are respectively applied to the linear adding circuit 22 in Fig. 1 via the circuit paths 108 and 110.

In accordance with conventional practice the control electrodes of the balanced modulator tubes 70, 72, 78 and 80 of Fig. 2 are connected with keyed clamping circuits 112, 114, 116 and 118 respectively. The general form of the keyed clamping circuits is well known and needs no detailed description here. Each comprises a pair of diodes, generally of the vacuum tube type, keyed into conduction by keying signals appearing across the windings 120, 122, 124 and 126 respectively. During conduction of diodes the control electrodes will be clamped to the potential established at the arms 128, 130, 132 and 134 respectively. The keying signal is inductively coupled to the windings 120, 122, 124 and 126 via the primary windings 136, 138, 140 and 142 which are in turn connected with the source of horizontal drive pulses. The I color difference signal balanced demodulator comprising tube 70 and 72 may be balanced by adjusting the potentiometer arms 128 and 130 so that during keying of the clamped circuit the control electrodes of the tubes 70 and 72 are clamped to a potential which will maintain the contributions of tubes 70 and 72 to the load circuit 104 equal. Under these conditions, as described above, the modulator circuit will be balanced. Likewise, the potentiometer arms 132 and 134 may be adjusted to balance the Q color difference signal modulator comprising tubes 78 and 80.

In accordance with the present invention the balance of each of the modulator circuits shown in Fig. 2 may be controlled by a direct curent (D. C.) balance control signal applied to the circuit path terminals 144 and 146 in Fig. 2 by the balancing signal producing means. The D. C. balance signals applied to these terminals are representative of the respective unbalance in their corresponding modulator circuits as described in connection with the balance sensing means arrangement of Fig. 1. In accordance with the present invention the balance signals for the I and Q modulators are, in the particular embodiment of Fig. 2, applied to the potentiometer 148 and 150 associated with the potentiometer arms 128 and 132 respectively. By this means the voltage level to which the control electrodes of tubes 70 and 78 are clamped during the clamping interval may be controlled by the balance signal and hence the contribution made by the tubes 70 and 78 to their respective load means 104 and 106. Thus, should for example the mutual conductance of tube 70 and 78 decrease with age the balance signals resulting from the detection of the resulting unbalance in the modulator circuits may cause the voltage levels to which tubes 70 and 78 are clamped to become more positive and thus increase the contributions of tubes 70 and 78 to their load circuits. Other ways of effectively applying a balance signal to the balanced modulator circuits of Fig. 2 will occur to those skilled in the art after benefiting from the teaching herein.

Figure 3:
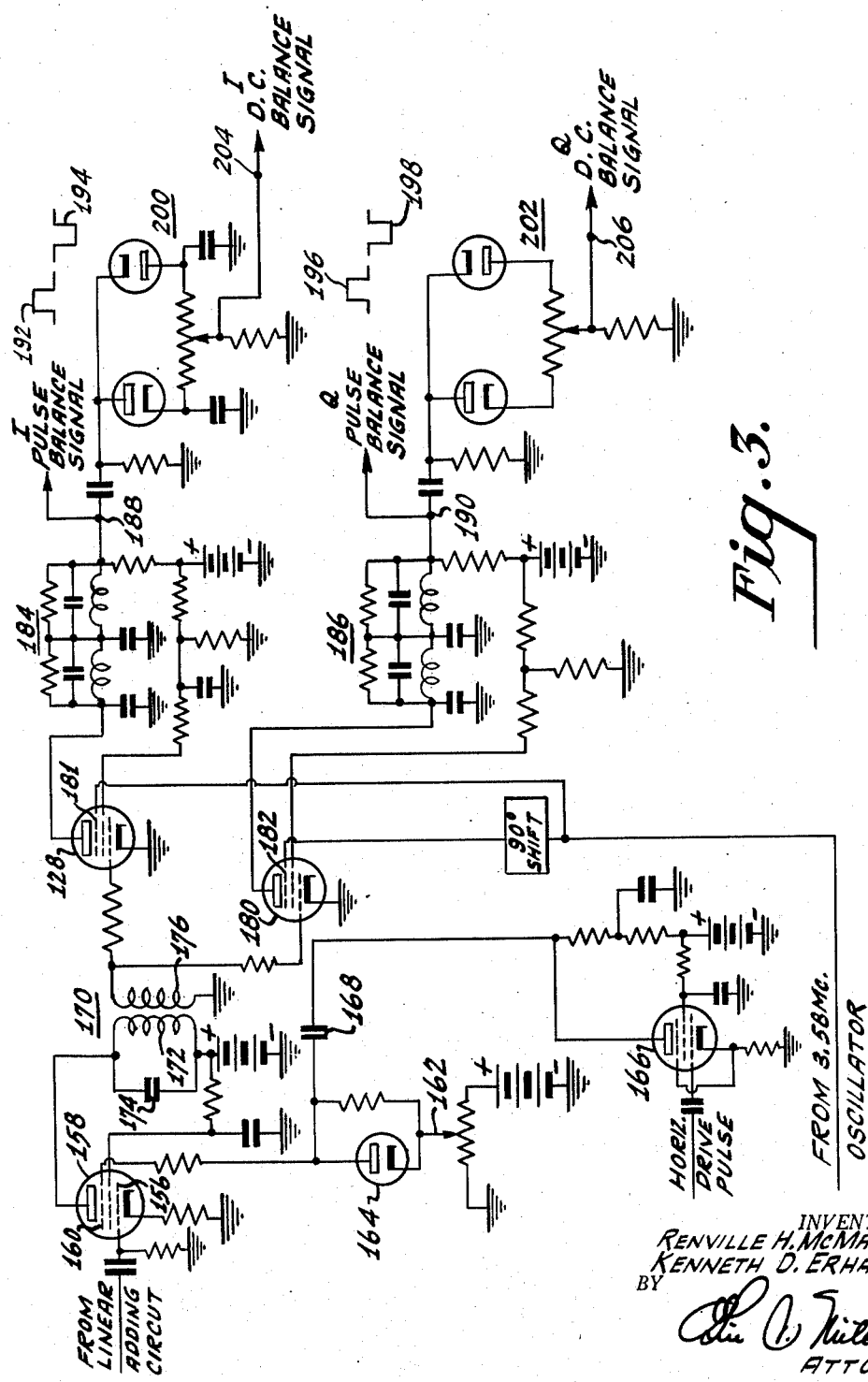
Fig. 3 is a schematic diagram representation of one form of balanced sensing means useful in the arrangement of Fig. 1 and embodying certain features of the present invention.

The balance sensing means 44 and 46 of Fig. 1 may also take a variety of forms in accordance with the present invention. By way of example, however, one type of balance sensing means which includes the gating and amplifying functions of elements 38 and 40 has been schematically shown in Fig. 3. Here the signal from the linear adding circuit 22 of Fig. 1 is capacitively coupled to the control electrode 156 of amplifier tube 158. The amplifier tube 158 provides both the functions of the amplifier 38 and the gated amplifier 40 in Fig. 1. Gating of the amplifier 158 in Fig. 3 is accomplished by the application of gating signals to the suppressor grid 160 which is clamped during keying to an adjustable reference potential at potentiometer arm 162 through the action of the diode 164. As indicated in Fig. 1 the keying signal may be nothing more than an amplified version of the horizontal drive pulses. The amplifier 166 in Fig. 3 is shown connected for this purpose. The amplified drive pulses are capacitively coupled via the capacitor 168 to the clamping diode 164. With such an arrangement the amplifier tube 158 may be rendered conductive only during the horizontal drive pulse intervals.

The load circuit for the amplifier 158 in Fig. 3 comprises the transformer 170 whose primary winding 172 may be tuned to the color subcarrier frequency by means of the capacitor 174. The secondary winding 176 of the transformer 170 is connected to the control electrodes of the demodulator tubes 178 and 180. I and Q carrier reference demodulating signals are applied respectively to the suppressor electrodes 181 and 182 of the demodulator tubes. In this way any signal sampled by the gated amplifier tube 158 will be vectorially multiplied with the carrier reference signals applied to the suppressor electrodes. The filter circuits 184 and 186 connected in the anode circuits of the demodulator tubes 178 and 180 are tuned to reject the carrier reference signals applied to the suppressor electrodes so that the signals appearing at terminals 188 and 190 will correspond only to the synchronous demodulation components of the signals applied to the control electrodes of tubes 178 and 180 respectively. Should the balanced modulator circuits of Fig. 1 be unbalanced, a pulse type wave form will appear at terminals 188 and 190, the polarity of which will depend upon which tube or branch of the balanced modulator circuits has in effect changed its characteristics to produce the unbalance. In Fig. 3 the output terminal 188 therefore may have a pulse wave form of the polarity 192 or of the opposite polarity 194. The amplitude of the pulses 192 and 194 will be a function of the magnitude of unbalance while the polarity, as before mentioned, will be determined by the nature of the unbalance in the balanced modulator circuit. Likewise pulses of the polarity 196 or 198 will appear at output terminal 190 as a consequence of unbalance in the Q balanced modulator. The pulse wave forms appearing at terminal 188 and 190 may be used directly as a balance signal as will be described hereinafter in connection with Fig. 4. However, by providing the respective rectifying circuits 200 and 202 the pulse balance signals 192 or 194 and 196 or 198 may be rectified to produce a positive or negative D. C. balance signal at the respective output terminals 204 and 206. The D. C. balance signals at terminals 204 and 206 will have a polarity representing the type of unbalance in the modulator circuit and a magnitude representing the degree of unbalance.

Thus in the arrangement of Fig. 2 the D. C. balance signals developed by the circuit of Fig. 3 may either decrease or increase the potential level to which the control electrodes of tubes 70 and 78 are clamped during the keying interval. In this way the balanced modulators of Fig. 2 may be corrected for unbalance in either of the arms comprising the modulators as a result of the fortuitous variation in the value of any parameter constituting the modulators.

The pulse balance signals provided at terminals 188 and 190 in Fig. 3 may be used directly without rectification to provide a balance control influence on a keyed type balanced modulator. For example, in Fig. 2, if any of the keyed clamping circuits associated with the control electrodes of the tubes 70, 72, 78 and 80 are purposely or fortuitously unbalanced, the potential to which each of the corresponding control electrodes is clamped will be rendered a function of the amplitude of the horizontal drive pulses applied to the clamping circuit. In practice, it is found that although an effort is made in the design and construction of keyed clamping circuits to maintain a perfect balance, a certain degree of unbalance will be present. Where the keying pulses are of constant amplitude this characteristic produces no problem. By purposely unbalancing the keying circuit associated with that tube of the modulator circuit it is desired to control, the balance of the modulator circuit may therefore be effectuated by controlling the amplitude of the keying pulses. Such an arrangement is shown in Fig. 4 in connection with the balanced modulator circuit of Fig. 2 comprising tubes 70 and 72.

Figure 4:
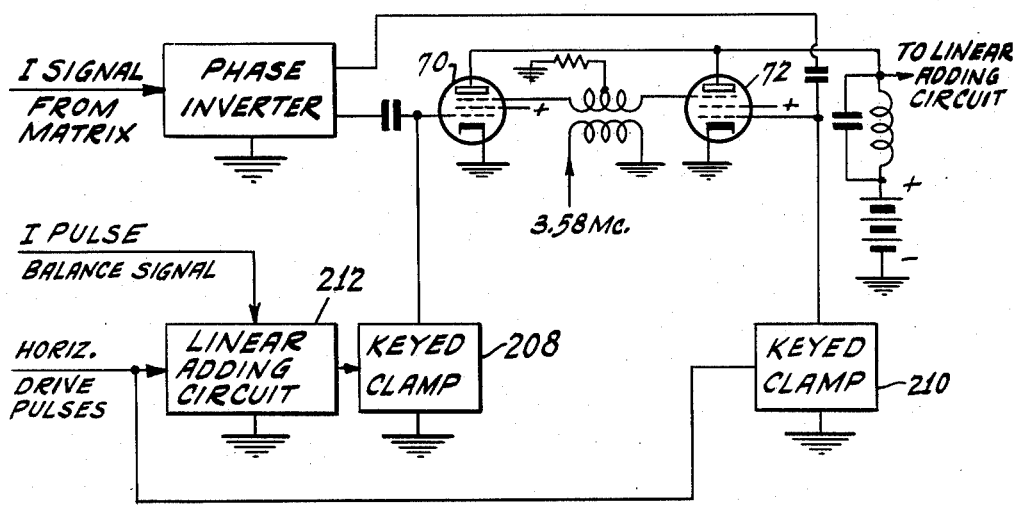
Fig. 4 is a combination block and schematic diagram representation of another form of balanced modulator control arrangement useful in connection with the arrangement of Fig. 1 and embodying certain features of the present invention.

In Fig. 4 the keyed clamping circuit associated with tube 70 of Fig. 2 is designated as 208, while the keyed clamping circuit associated with tube 72 is designated as 210. The clamping circuit 208 may be purposely unbalanced, or advantage may be taken of the residual unabalance inherently in the circuit so that a variation of the amplitude of keying signal applied to the clamping circuit 208 will provide an effective means for controlling the balance in the modulator circuit. This may be accomplished in accordance with the present invention by means of a linear adding circuit 212 which combines the horizontal drive pulses with the pulse balance signal delivered at terminal 188 of Fig. 3. In this way the amplitude of the keying pulses applied to the clamping circuit 208 will be the sum of the horizontal drive pulses and the pulse balance signal delivered by the modulator 178 of Fig. 3. Keying pulses applied to the clamped circuit 208 will therefore increase in amplitude in response to a pulse balanced signal such as 192 in Fig. 3 and decrease in amplitude in response to a pulse balanced signal such as 194 in Fig. 3. Due to the inherent time constant of the clamping circuits the adjustment in clamping level during the horizontal drive pulse interval will maintain the corrected balance of the modulator throughout the following horizontal line period.

What is claimed is:

1. In a balanced modulator system, the combination of: a source of intelligence signal; a source of carrier signal to be modulated wtih said intelligence signal; reference potential datum means; a balanced modulator circuit having intelligence signal input terminals, carrier signal input terminals, and output signal terminals; said modulator circuit comprising a first and a second amplifier device, each amplifier device having input terminals operatively coupled to said intelligence signal and carrier signal input terminals, and each amplifier device being connected in balanced driving relation to an output load circuit such that when said load circuit is driven by said amplifier device, said intelligence signal and carrier signal representations tend to be cancelled in said load circuit leaving developed across said load circuit substantially only modulation products representing the vectorial multiplication of said carrier signal by said intelligence signal, said amplifier devices having operatively connected thereto circuit parameter means of predetermined nominal value defining the operation thereof, the completeness of said cancellation being subject to fortuitous variations in the values of said circuit means, the degree of cancellation being determined by the direct current level of said intelligence signal input terminals relative to said reference potential datum means; means operatively coupling said signal sources respectively to said input terminals in the order named; separate keyed signal clamping means operatively coupled with said first and second amplifier device respectively for periodically clamping the potential of said input terminals to respective direct current potential datum levels in accordance with applied keying signals; a source of periodically recurrent keying signals; means operatively coupling said keying signal source to said clamping means for controlling said periodic clamping; a gatable signal amplifier operatively coupled to said modulator output circuit terminals and responsive to applied gate signals to pass signal information appearing at said modulator output circuit terminal only during the periods defined by said gate signal; a source of gate signals synchronously related to said keying signals; means operatively applying said gate signals to said gatable amplifier for control thereof; means responsive to said carrier signal coupled with the output of said gatable amplifier to develop a control signal in response to the carrier signal conditionally passed by said gatable amplifier; control signal responsive means coupled with at least one of said clamping means for altering the value of direct current datum level to which its respective input terminal is clamped to permit the degree of signal cancellation in said load circuit to be controlled in accordance with a control signal; and means coupling said control signal to said control signal responsive means with such electrical sense as to maintain substantially constant the degree of signal cancellation in said load circuit irrespective of said fortuitous variations in the values of said parameters.

2. In a color television system for producing compatible dot sequential television signals, the combination of: the source of at least three variable amplitude direct color signals representing different complementary color aspects of a television scene, said signals having a periodically recurring picture scanning component; a matrix circuit operatively coupled with said source combining said signals in predetermined relationship with one another to produce at least a first and second color difference signal; a source of color subcarrier signal bearing a substantially fixed time relationship to the periodically recurrent component of said direct color signals; a phase shifting means operatively coupled with said subcarrier signal source for shifting a phase of said subcarrier by a fixed amount; a first and a second modulation circuit for vectorially multiplying two electrical signals, each modulation circuit having balanced intelligence signal input terminals, carrier signal input terminals, and signal output terminals, each modulation circuit including signal responsive means for controlling the degree of cancellation of signals applied to said input terminals so that a substantially low amplitude of carrier signal appears at said output terminals along with a substantially large magnitude of modulation products; means operatively coupled with each said modulation circuit intelligence signal input terminal for controllably and periodically clamping all of said balanced intelligence signal input terminals to a substantially fixed potential during which periods the degree of carrier signal cancellation in said modulation circuit is indicated by uncancelled carrier signal information appearing at said output terminals, a source of periodically recurrent clamping control pulses operatively coupled in controlling relation to said clamping means, said clamping pulses being synchronously related to the recurrent component of said direct color signals; signal coupling means operatively applying said first and second color difference signals to the intelligence signal input terminals of said first and second modulators respectively; signal coupling means operatively applying said color subcarrier and phase shifted color subcarrier signals to the carrier signal input terminals of said first and second modulators respectively; a linear signal adding circuit operatively coupled wtih the output terminals of both said modulators for linearly combining the modulation products produced by each modulator to form a composite signal; gated amplifier means operatively coupled with the output of said adding circuit for accepting said composite signal; a source of gating signals synchronously related to said clamping control pulses; means operatively applying said gating signals to said gated amplifier for gating said amplifier into a condition of signal amplification only during those periods in which said modulation circuits are clamped, so that said gated amplifier delivers substantially only those electrical variations corresponding to uncancelled carrier signal; a first and a second synchronous demodulator circuit each having an intelligence signal input terminal, a reference signal input terminal and an output signal terminal; means operatively applying the output of said gated amplifier to the intelligence signal input terminals of both of said demodulators; means operatively applying said color subcarrier and phase shift color subcarrier to the reference signal input terminals of said first and second demodulators respectively such that the amplitude and polarity of direct current signal delivered by said demodulators depict the characteristic and identity of any uncancelled carrier signal delivered by said gated amplifier; and means operatively applying the output signals of said first and second demodulators to said first and second modulators in controlling relation thereto in an electrical sense tending to correct for the development of any unbalanced circuit operation in said modulators.

References Cited in the file of this patent

UNITED STATES PATENTS

| | | |
|---|---|---|
| 2,186,958 | Collins | Jan. 16, 1940 |
| 2,292,869 | Dillenburger | Aug. 11, 1942 |